April 12, 1966  J. VAN DEN KIEBOOM  3,245,285
OVERLOAD PROTECTOR FOR MACHINE TOOLS
Filed Feb. 28, 1964  4 Sheets-Sheet 4

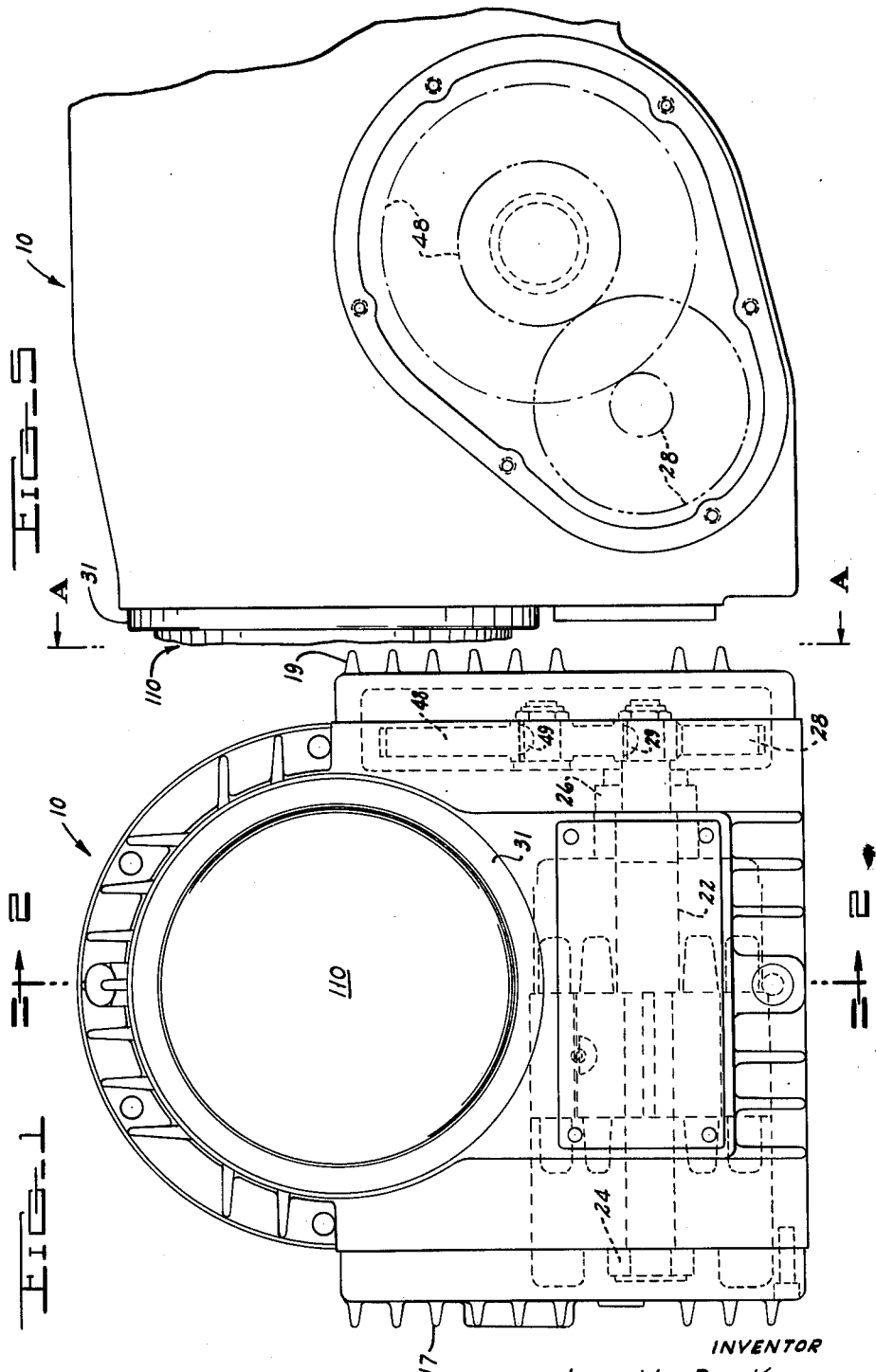

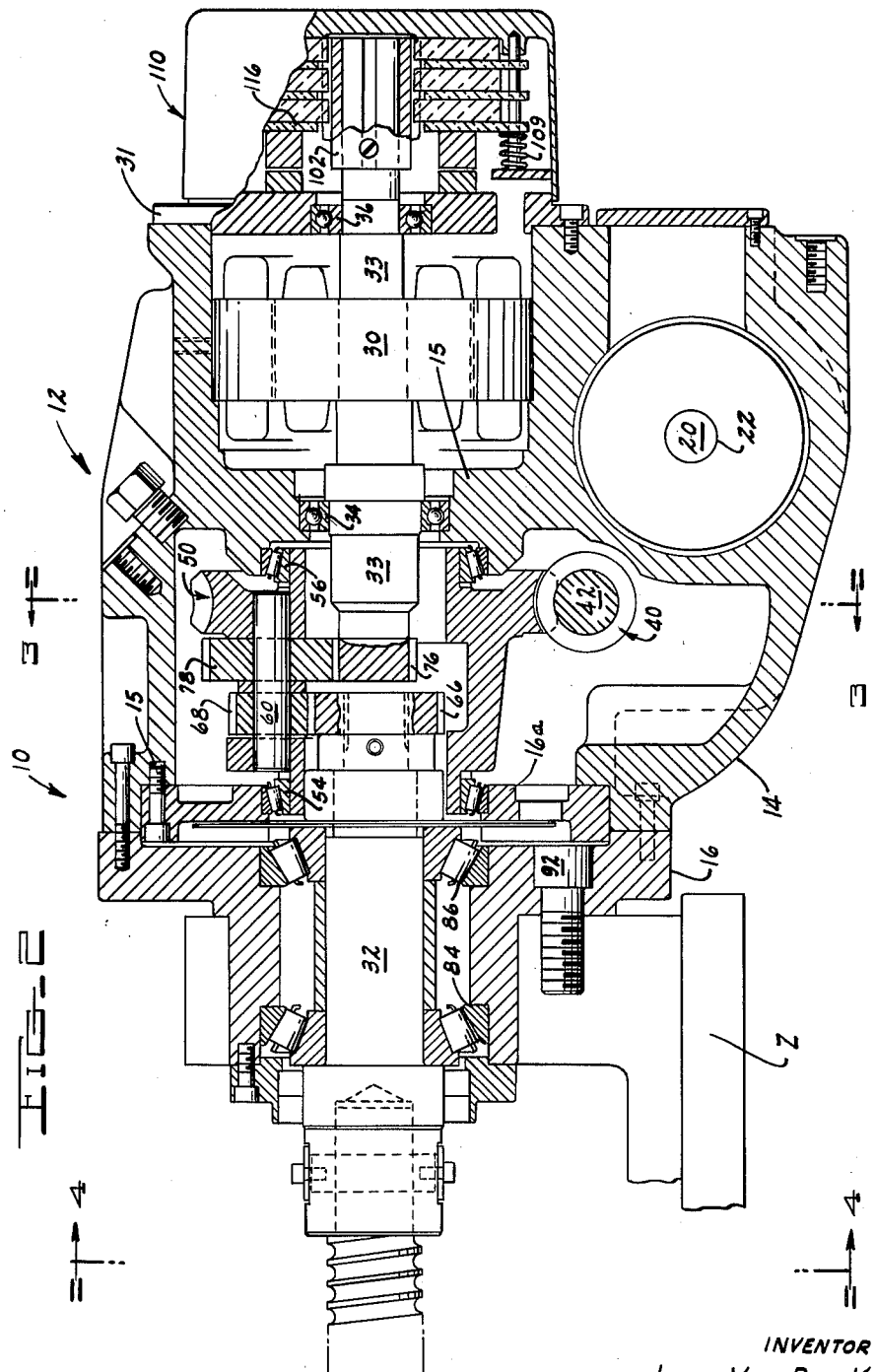

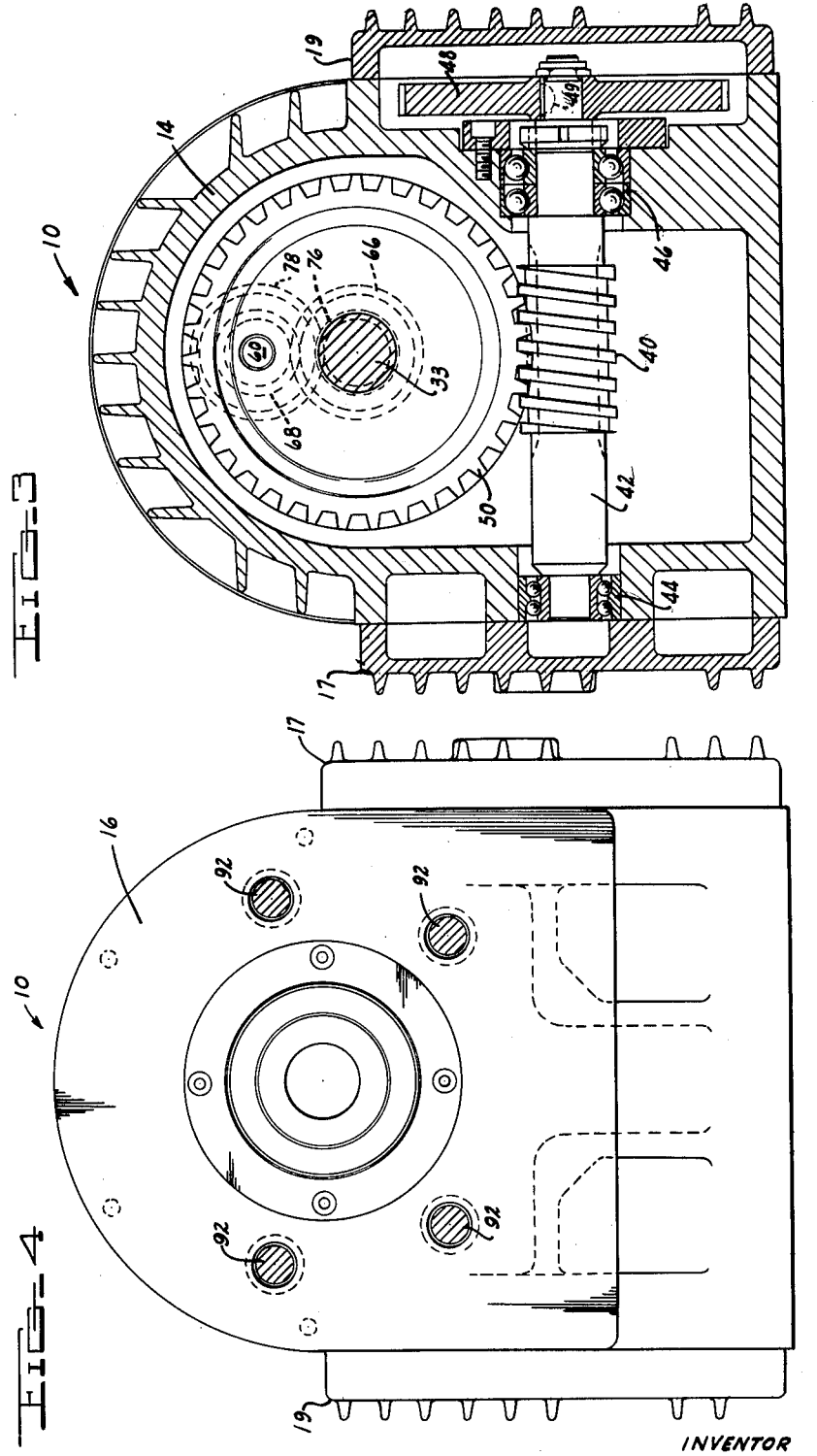

INVENTOR
JOHN VAN DEN KIEBOOM

3,245,285
OVERLOAD PROTECTOR FOR MACHINE TOOLS
John van den Kieboom, Mount Clemens, Mich., assignor to La Salle Machine Tool, Inc., Warren, Mich.
Filed Feb. 28, 1964, Ser. No. 348,008
7 Claims. (Cl. 74—675)

The present invention relates to new and useful improvements in machine tools and more particularly to an efficient, self contained and mechanically driven two speed machine tool which is interchangeable with hydraulic equipment now used extensively throughout the industry, said machine tool having at least one built in overload protective device therein.

It is a primary object of the present invention to provide a mechanically driven machine tool which is overload protected in one or more ways and capable of being driven at one or more speeds.

Another object of the invention is the provision of a self contained machine tool, wherein change gears are readily accessable without dismantling of the machine.

Still another object of the instant invention is the provision of a simple, durable and compact machine tool, wherein tanks, pumps and piping are not required, while the output torque is adjustable within a pre-determined range.

Another object of the present invention is the provision of a self contained machine tool which is interchangeable with hydraulic equipment now in use, which machine tool is more utilitarian and less costly than other available equipment.

Another object of the invention is the provision of a machine tool which is equipped with load cells and/or strain gages to effect a shut down of the machine in the event of overload.

The above and other objects can be accomplished by the provision of a unitary, self contained and horizontally positioned machine tool wrich is front mounted and overload protected, said machine tool having a housing body of generally symmetrical configuration; a worm gear journaled on a shaft in said housing body; a first output shaft; a second output shaft; a worm wheel housing a plurality of reduction gears disposed between said first output shaft and said second output shaft, said worm wheel cooperable with said worm gear; a first driving means for said worm gear and shaft; a second driving means for said reduction gears, the shaft for said second driving means and said second output shaft being one and the same; said driving means disposed at right angles to each other and enclosed within said body housing; a load cell cooperable with said worm gear shaft; a commercial readout system and safety shut off device, said readout system for the determination of any overload on said worm gear shaft; an energizable, magnetic friction brake secured to said housing and cooperable with said second output shaft, said friction brake being adjustable to provide a pre-determined torque load; interchangeable change gears intermediate said first drive means and said worm gear shaft, said change gears on the outside of said body housing and readily accessible without dismantlement of the machine; simultaneous rotation of each of said driving means results in said first output shaft rotating rapidly, de-energization of said second driving means and energization of said friction brake results in said first output shaft rotating at a slower rate; obstruction of said first output shaft is detected by the load cell through said worm gear shaft and readout safety device to shut the machine down, failure of the load cell and safety device causing the load to be transferred to the second output shaft, thus permitting the friction brake to slip against the pre-determined torque load, thereby preventing any overload.

Other objects of this invention will appear in the following description and appended claims, reference being had to the accompanying drawings, which form a part of this specification, wherein like reference characters designate corresponding parts in the several views.

In the drawings

FIGURE 1 is an end elevation of a machine tool which embodies the present invention.

FIGURE 2 is a cross sectional view taken along lines 2—2 of FIGURE 1.

FIGURE 3 is a cross sectional view taken along lines 3—3 of FIGURE 2.

FIGURE 4 is a front elevational view taken in the direction of the arrows 4—4 of FIGURE 2.

FIGURE 5 is a side view of the change gear opening in the body housing, as indicated by the directions of arrows identified by the letters A—A.

Figure 6:
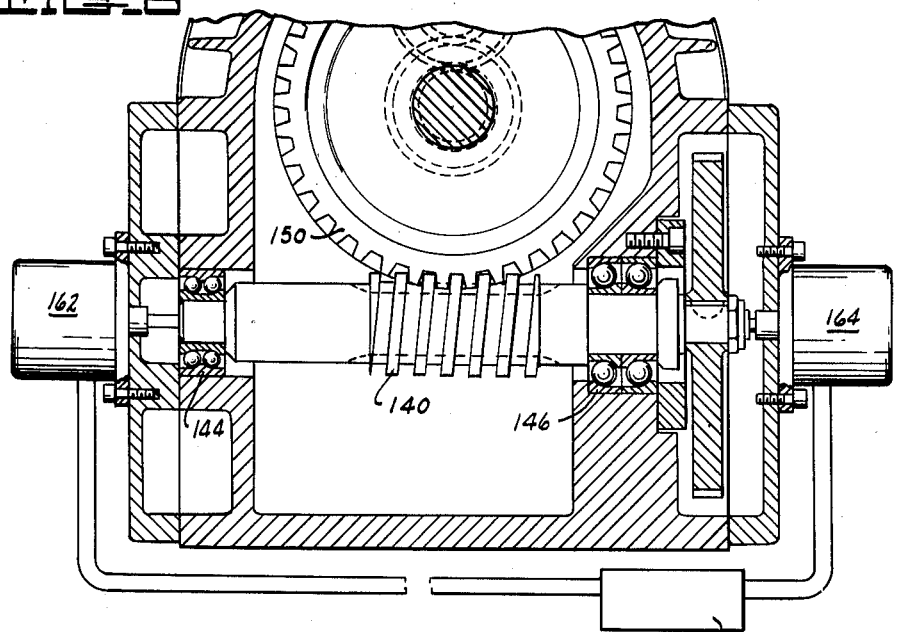
FIGURE 6 is a cross sectional view similar to FIGURE 3, which illustrates the load cells used for overload protection.

Before explaining the present invention in detail, it is to be understood that the invention is not limited in its application to the details of construction and arrangement of parts illustrated, since the invention is capable of other embodiments and of being practiced and carried out in various ways. Also, it is to be understood that the phraseology or terminology employed herein is for the purpose of description and not limitation.

Referring to the drawings, FIGURE 1 illustrates an end elevation of a machine tool 10 which embodies the present invention. From this view, it is readily apparent that the configuration of the machine tool of the present invention is generally symmetrical.

FIGURE 2 of the drawings is a cross section taken along lines 2—2 of FIGURE 1. The housing 12 is made up of four parts, the housing body 14, the front cover 16, which forms the support for one output shaft 32 and two cover members 17 and 19.

Within the housing 12 are two drive motors 20 and 30. Drive motor 20 has a shaft 22 journaled in bearings 24 and 26, bearing 24 is located in housing cover 17 while bearing 26 is positioned in the housing side wall. Immediately adjacent to bearing 26 is a change gear, which is rotatably mounted on shaft 22 and keyed thereto. The change gear is identified by numeral 28 and the key by numeral 29.

Mounted in parallel relationship to the drive motor 20 and the drive motor shaft 22 is a worm gear shaft 42. A worm gear 40 is keyed to said worm gear shaft 42 intermediate the ends thereof. The worm gear shaft 42 is journaled in bearings 44 and 46. The bearings are mounted in the sidewalls of the housing body 14. A second change gear 48 is mounted on the worm gear shaft 42, in toothed engagement with change gear 28. Change gear 48 is keyed to shaft 42 with key 49. The housing cover 19 encloses said change gears 28 and 48.

Therefore, when the drive motor 20 is rotated, drive motor shaft 22 is rotated, which in turn causes the change gears 28 and 48 to rotate and thus turn the worm gear shaft 42, which is mounted in parallel relationship thereto.

A second drive motor 30 is located in said housing 14 at right angles to the first drive motor 20. The second drive motor 30 is positioned along the longitudinal axis of the housing 14 and is secured in position with a flange 31 mounted on the end of the housing. Flange 31 also serves to locate and position a magnetic brake (friction) which is secured to said housing. In addition, the central portion of the flange has a bearing 36 therein which supports one end of drive shaft 33. The forward end of the drive shaft 33 is supported in a bearing 34 located in the housing wall 15.

The front housing cover 16 is of two part construction, one cover 16a inside of cover 16. Both cover sections are secured to the front of the housing 14. Cover section 16a has a bearing 54 in the central portion thereof for the support of a worm gear housing 50, while a second bearing 56 in the housing wall 15 supports the other end of said worm gear housing. The worm gear housing 50 is generally hollow and has mounted therein a plurality of reduction gears. Reduction gears 68 and 78 are rotatably mounted on shaft 60 supported in said worm gear housing. Reduction gears 66 and 76 are mounted in toothed engagement with gears 68 and 78 respectively. The reduction gear 76 is on the end of the motor drive shaft 33, while reduction gear 66 is mounted in the splined portion 65 of the output shaft 32. The output shaft 32 is carried by the front cover member 16 and is journaled in bearings 84 and 86.

It is now readily apparent that when drive motor 30 is driven, drive shaft 33 will be rotated, which in turn will rotate the reduction gears 76, 78, 68 and 66, thereby rotating the output shaft 32.

Another toothed member 102 is secured to the outer end of motor shaft 33, which toothed member drives a plurality of friction discs. Interposed between the friction discs are a plurality of fixed discs 116, which of course could be of any configuration. The fixed discs 116 are spring loaded with springs 109 and adjustable with the use of interchangeable springs. An electromagnet is disposed adjacent thereto and is either automatically energized or manual in operation. The above described brake is identified by numeral 110.

Figure 7:
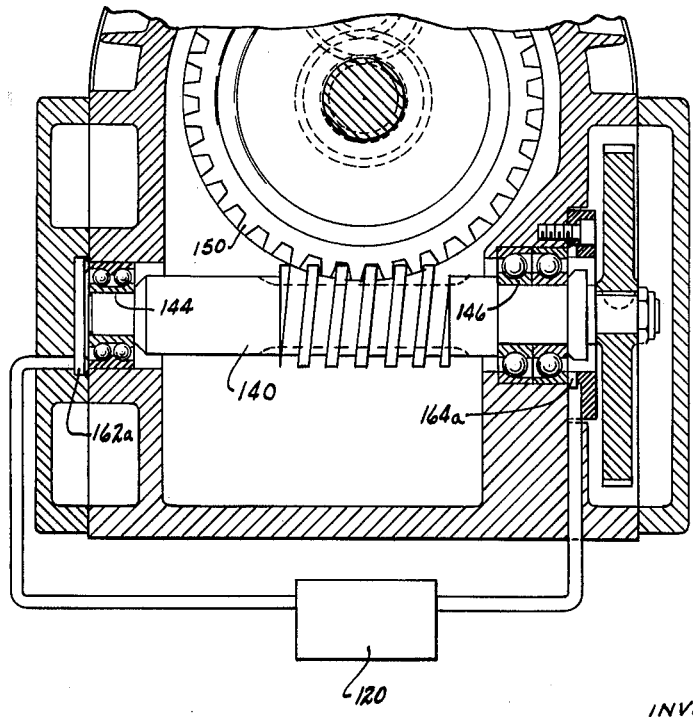
FIGURE 7 is a cross sectional view similar to FIGURE 3, illustrating the use of load cells for overload detection.

FIGURES 6 and 7 illustrate a partial cross section similar to FIGURE 3, with a schematic showing of the commercial readout system identified by numeral 120. The worm gear shaft 140 and worm wheel 150 are positioned in housing 114. In this structure, two strain gage load cells 162 and 164 are mounted adjacent the ends of the worm gear shaft 142. The readout system 120 will detect any overload in the thrust load applied to shaft 140, so that if an overload does occur, the machine will be shut down, or other signal will be given, such as a red light, bell etc. Because of the usage to which this machine may be used, it must be understood that while the strain gage load cells are illustrated as being positioned adjacent the worm gear shaft 140, they could of course be positioned adjacent the bearings 146, as shown in FIGURE 7 of the drawings, or a myriad of other positions, without departing from the present invention. It must also be understood that the machine tool of the present invention can be efficiently operated in either direction.

In operation, both drive members 20 and 30 are rotated simultaneously. Motor 20 is driven to rotate shaft 22, which in turn rotates change gears 28 and 48 to rotate worm gear 40 on shaft 42. Motor 30 drives shaft 33, which in turn rotates reduction gears 76, 78, 68 and 66. This in turn rotates the output shaft 32 rapidly. Upon de-energization of motor 30 and application of the friction brake 110, the output shaft 32 will rotate at a slower speed, through rotation of the worm wheel 50 by the continued rotation of drive motor 20. Should for any reason output shaft 32 become obstructed, an overload will occur in shaft 42 or 140. When the overload is in shaft 142, the load cells will detect the overload through the readout system 120 to shut the machine down or render another signal. In the event of failure of the load cells 162 and 164, the overload will be transferred to drive shaft 33 of motor 30. Shaft 33 will then be driven against a pre-determined friction load applied by the brake 110. This of course will prevent any overload whatsoever on output shaft 32 which might cause ultimate damage to the machine tool 10 or the tools which it may be operating.

The complete assembly is self contained in a single unit. It operates in an oil bath, which is maintained at a predetermined level, the heat generated during operation is dissipated through the fins disposed in the covers 17 and 19 and the housing body 14.

For ease of description, no particular emphasis has been placed on the structure employed, although it must be understood that the motors 20 and 30 are held against rotation as are the various gears employed. This of course can be accomplished in many ways and the means illustrated is used as an example only. It is also to be understood that the front cover construction is shown for purposes of illustration only. Cover member 16a is secured to the housing 14 with screws 15 and cover 16, the outer cover is secured to the body housing 14 with screws 13. The outer cover 16 being secured to a machine base "Z" with a plurality of screws identified by numeral 92. The output shaft 32 is carried by the front cover 16, supported in bearings 84 and 86.

From the foregoing, it will be recognized that the present invention is simple, durable and utilitarian. It can be manufactured in quantity, using modern mass production methods and in ultimate usage will not require the use of hydraulic pumps, tanks, accumulators or the like, while being interchangeable with hydraulic units now in use.

Having thus described by invention, I claim:

1. In a self contained and horizontally positioned, front mounted machine tool equipped with an overload protective device, the combination of,
a housing of generally symmetrical configuration;
a worm gear and worm wheel in said housing;
said worm gear journaled on a shaft;
a load cell on said shaft for measuring the thrust loads applied thereto;
a commercial readout system and safety shut off device;
a plurality of reduction gears housed in said worm wheel;
a first driving means for rotating said worm gear and worm wheel;
a second driving means for rotating said reduction gears;
said first and second driving means enclosed in said housing;
a first and second output shaft;
each of said output shaft members in axial alignment;
an energizable friction brake secured to said housing;
said friction brake cooperable with said second output shaft;
simultaneous rotation of said first driving means and said second driving means causing said first and second output shaft members to rotate rapidly, while energization of said brake and de-energization of said second driving means causes said first output shaft to rotate at a slower rate, obstruction of the rotation of said first output shaft is detected by the load cell through the readout system to shut the machine down automatically, while with failure of the load cell and readout safety shut down device, the second output shaft will be rotated and will slip against the friction brake to prevent any overload on said first output shaft.

2. A device as in claim 1, wherein said friction brake is magnetically operated.

3. A device as in claim 1, wherein said friction load on said friction brake is adjustable.

4. A device as in claim 1, wherein a load cell is positioned adjacent the end of said worm gear shaft.

5. A device as in claim 1, wherein a load cell is positioned adjacent each end of said worm gear shaft.

6. In a horizontally mounted machine tool, the combination of,
a generally symmetrical housing;
a worm gear and worm wheel, said worm wheel forming a support for a plurality of reduction gears housed therein;

independent means for driving said worm gear and worm wheel reduction gears;

said independent driving means disposed at right angles to each other;

means for limiting one of said independent driving means and said reduction gears to effect a two speed drive;

a divided output shaft;

simultaneous rotation of said independent driving means rotating one portion of said output shaft at a rapid rate, while limiting the rotation of said reduction gears and independent driving means associated therewith causes said output shaft to rotate at a reduced speed;

a load cell interposed adjacent to said worm gear;

a readout system connected to said load cell for automatically de-energizing said machine when an overload in excess of a pre-determined amount occurs.

7. In a self contained machine tool, equipped with an overload protective device, the combination of, a housing of generally symmetrical configuration;

a worm gear and worm wheel in said housing;

a plurality of reduction gears rotatably positioned in said worm wheel;

a first driving means for rotating said worm gear;

a second driving means for rotating said reduction gears, said driving means disposed at right angles to said first driving means;

a first and second output shaft;

a strain gage secured to an output shaft for determination of loads applied thereto;

a commercial readout system connected to said strain gage for the determination of any overload;

an adjustable friction brake cooperable with said second output shaft, reduction gears and driving means;

simultaneous rotation of each of said driving means causes said first output shaft to rotate at a rapid rate, while energization of said friction brake limits the rotation of said reduction gears and said second driving means thereby causing said first output to rotate at a slower speed, any overload will be detected by the readout system through the strain gage to shut the machine down.

References Cited by the Examiner
UNITED STATES PATENTS

| | | | |
|---|---|---|---|
| 2,519,042 | 8/1950 | Granberg et al. | 74—675 X |
| 2,535,352 | 12/1950 | Cumfer | 74—675 X |
| 2,781,616 | 2/1957 | Estabrook | 74—675 X |

DAVID J. WILLIAMOWSKY, *Primary Examiner.*

DON A. WAITE, *Examiner.*

R. J. BIRD, H. S. LAYTON, *Assistant Examiners.*